May 16, 1961  J. DICHTER  2,984,048
MACHINE FOR FINISHING AMPULLAE AND SIMILAR GLASS OBJECTS
Filed March 28, 1957  2 Sheets-Sheet 1
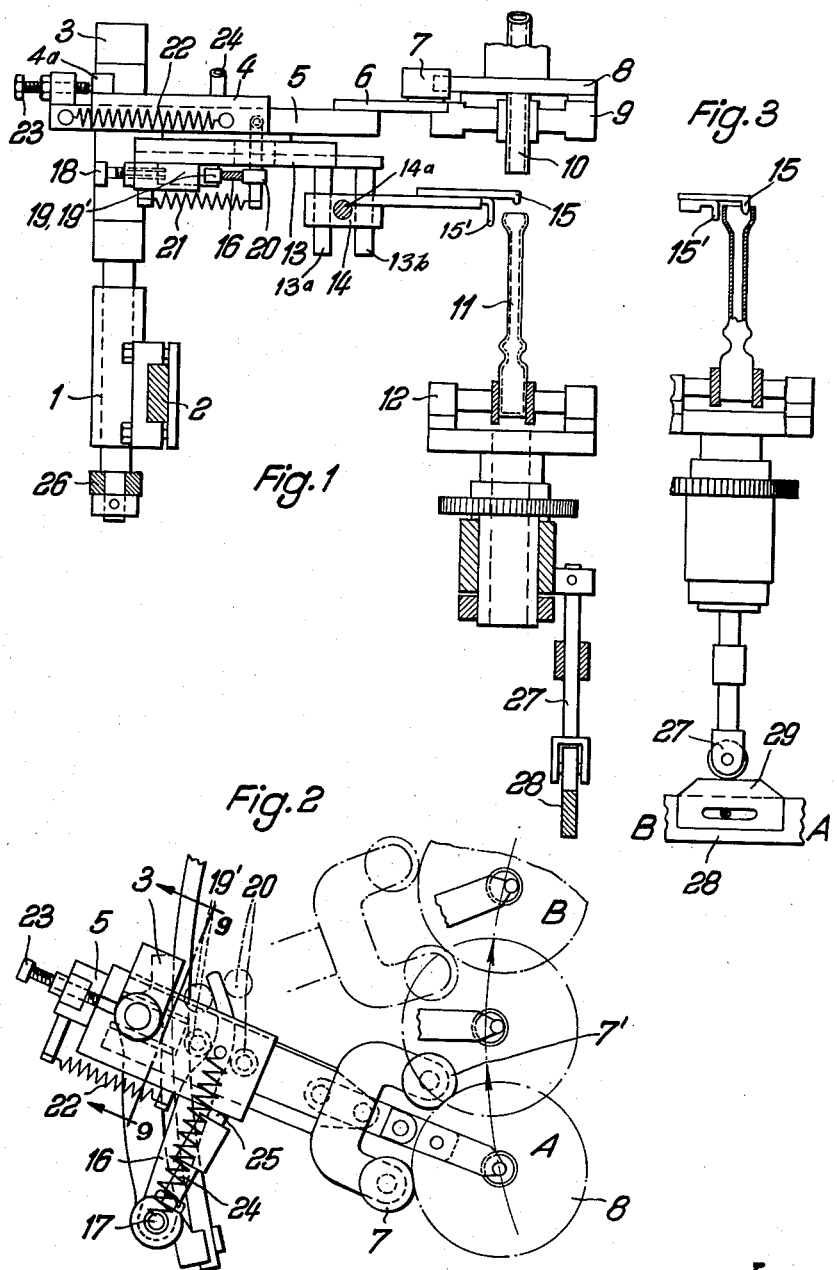
Inventor:
JAKOB DICHTER
by Mead, Browne, Schuyler & Beveridge
ATTORNEYS May 16, 1961  J. DICHTER  2,984,048
MACHINE FOR FINISHING AMPULLAE AND SIMILAR GLASS OBJECTS
Filed March 28, 1957
2 Sheets-Sheet 2
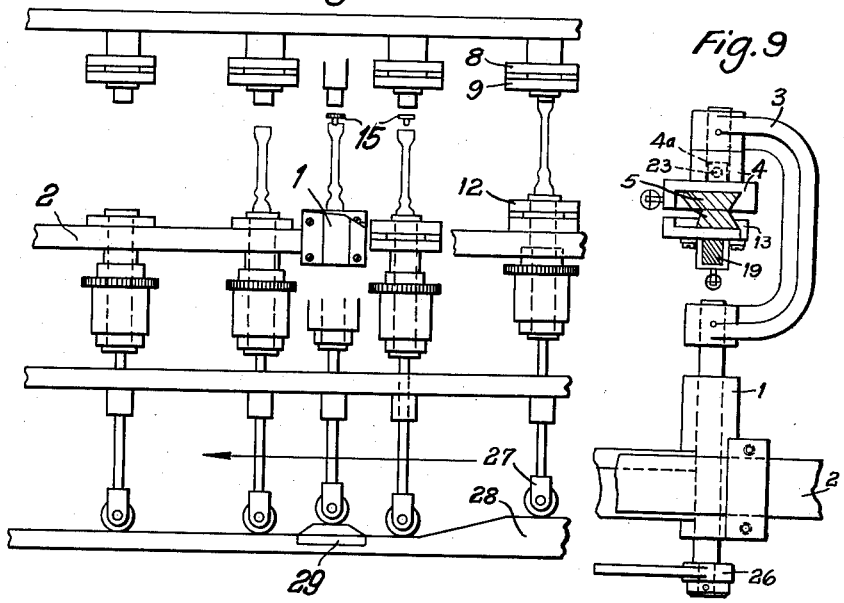
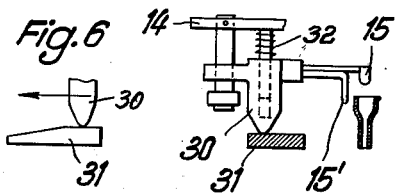
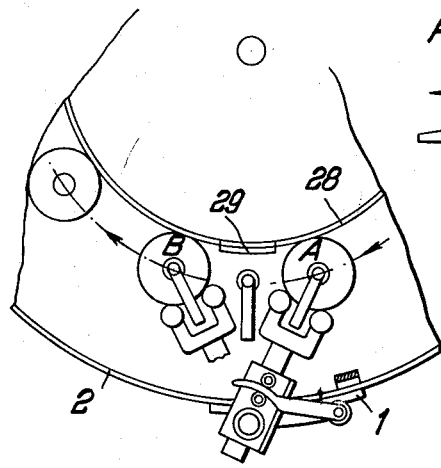
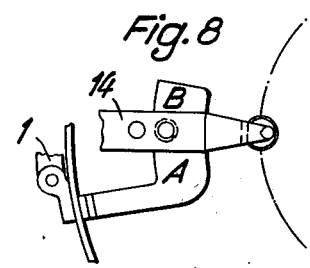
Inventor:
JAKOB DICHTER
by Mead, Browne, Schuyler & Beveridge
ATTORNEYS

United States Patent Office 2,984,048
Patented May 16, 1961

2,984,048
MACHINE FOR FINISHING AMPULLAE AND SIMILAR GLASS OBJECTS

Jakob Dichter, Sachsendamm 93, Berlin-Schoneberg, Germany

Filed Mar. 28, 1957, Ser. No. 649,045

Claims priority, application Germany Mar. 29, 1956

12 Claims. (Cl. 49—7)

The present invention is used in the well-known method of producing ampullae and similar glass objects which are, for the most part, manufactured of proportioned glass tubing in a continuous working method, and are separated from the tubing stock by melting them off. This melting off occurs as a rule during the formation of two bottoms, or bases, one of which remains on the ampulla while the other is burst open through the excess pressure and heat produced in the interior of the ampulla.

Whenever the melting off occurs without forming any bottom, and consequently only a melting through occurs, just as in the bursting open of the bottom, there is formed inwardly an annular torus or bulge which narrows the opening. The resulting opening has the advantage that in presenting it to the flame, no splinters result and the filling needle can be inserted easily.

Before filling, the ampullae are washed by introducing a spray nozzle into them for a water injection with the ampulla directed downwardly so that the wash water flows out freely and carries out sediment.

In bursting through or melting through, the resulting inwardly extending bulge causes an obstruction because the opening is narrowed so that sediment adheres, falling back into the ampullae while filling them with the opening directed upwardly.

Upon bursting open, the opening is largely displaced, and it often happens that it is not circular; and in incomplete bursting open some dangers are produced when inserting a needle.

Today, ampullae are for the most part not washed singly, but rather they are placed in a frame provided with numerous holes and brought to the washing machine in a group. The holes in the frame must be narrower than the body diameter of the ampullae. Especially in small ampullae of about 1 cc. content, in which the point diameter is wide, little room remains for the opening at the funnel-shaped end for the unavoidable inaccuracy while melting off and bursting open.

These disadvantages are removed in the present invention and other advantages are achieved.

The invention consists in this: after melting-off and bursting open of the end of the ampulla, a mandrel-shaped tool is introduced into the opening which has been created, and the inwardly directed edge of the torus or bulge is widened, after introduction of the mandrel-shaped tool into the opening which has been created in the end of the ampulla, by movement of the tool in the ampulla opening in a direction normal to the longitudinal axis of the ampulla to form a smooth-walled, funnel-shaped ampula end.

If this movement occurs between the tool and the neck-opening of the ampulla only axially, the torus often pushes against the tool and produces a defective piece, especially if, for any reason, the opening was incomplete in the bursting open.

To avoid this disadvantage according to the invention, a mandrel-shaped tool of smaller diameter than the final opening is introduced, and relative movement between the ampulla and the tool is accomplished along a path extending radially at an acute angle to the axis of the ampulla. By this operation the annular bulge is moved from within, outwardly and an almost smooth-walled, flowing opening with a funnel shape is produced.

Simultaneously, the outside diameter of the funnel-shaped end of the ampulla is made as symmetrical as possible for setting it in the hole of the frame, by a molding member which is arranged near the mandrel-shaped tool so that in the lateral movement of the mandrel-shaped tool and the simultaneous widening of the annular bulge, the molding member is guided against the rim and forms a substantially cylindrical surface.

Fig. 1 shows a side view of the arrangement;
Fig. 2 shows the plan view;
Fig. 3 is a front view of the lower chuck in working position;
Fig. 4 is the partial view of the chuck cycle of an automatic ampulla machine;
Fig. 5 presents the plan view of the entire device;
Figs. 6, 7 and 8 show another device for raising and for lowering the tool;
Fig. 9 is a cross-sectional view taken on line 9—9 of Fig. 2.

The invention is carried out on a conventional ampulla machine in which several working units composed of two chuck devices rotate continuously about an axis. The axial movement of the chuck devices to draw out the points of ampulla and for melting off the tubing stock in forming the bottom, or base, is guided in the well known way by the use of a cam track 28 on supporting rods 27 provided with rollers which are raised and lowered to axially shift the lower chuck devices.

For example, axial movement occurs between the ampulla body 11 and the mandrel-shaped tool 15 by engagement of the cam member 29 on the cam track 28 with a roller on the support rod 27 whereby the ampulla body 11 is brought within working range of the tool 15.

Alternatively relative axial movement between tool 15 and the chuck (and, of course, the ampulla carried by the chuck) may be accomplished through a carrier 30 (see Figs. 6, 7 and 8) which is urged downwardly against curved track or cam 31 on holder 1 by spring 32.

At an end forming station is a sleeve 1 which is secured to a support ring 2 on the frame of an automatic ampulla machine. A swinging holder 3 carries a guide 4 swingable about the axis of sleeve 1 and in which the carriage 5 moves radially. The lower end of holder 3 is supported by a lever 26. On the end of carriage 5 is a support 6 on which a pair of rollers 7 and 7' are mounted. These rollers engage the circular flange 8 of the rotating stop chuck 9 which holds one end of glass tubing 10 from which the ampulla 11 is drawn off by axial movement of lower chuck 12. Both chucks 9 and 12 rotate with the same speed and move in a circular path with other chucks around the fixed axis of the automatic machine. Slidably mounted beneath carriage 5 is an auxiliary carriage 13 which carries depending posts 13a and 13b. Arm 14, carried on posts 13a and 13b, may be adjusted vertically along these posts and locked by the member 14a. At the end of arm 14 is the tool 15 and the molding member 15'. The position of the auxiliary carriage 13 is changed relative to carriage 5 by a cam member 16 which is mounted on a fixed point 17 of the bed 1. Set screw 18 on carriage 13 pushes the carriage member 19 with rollers 19' against the curved member 16 which arrangement on roller 20 is on the carriage 5. The tension spring 21 holds the parts in question together.

One side of cam member 16 is engaged by roller 19' on carriage member 19 which is rigidly positioned on auxiliary carriage 13 by a set screw 18. Roller 20 mounted on carriage 5 engages the other side of cam member 16. Spring 21 urges rollers 19 and 20 toward each other whereby the position of auxiliary carriage 13 relative to main carriage 5 is determined by the thickness of the cam member 16 between the rollers. Set screw 18 has the effect of adjusting the amount of tension between rollers 19' and 20 acting on cam member 19.

The tension spring 22 urges the main carriage 5 forwardly until the stop screw 23 engages a stop 4a on guide 4. Normally spring 24 holds guide 4 against a fixed stop 25 until a chuck moves to position A (Fig. 2) and flange 8 engages rollers 7. As the chucks 9 and 12 move in their circular path from position A to position B (Fig. 2) rollers 7 remain in contact with flange 8 under the force of spring 22 and thereby retain carriage 5 at a constant radial distance from the axis of chucks 9 and 12.

At the same time, rollers 19 and 20 ride along converging sides of cam member 16 so that auxiliary carriage 13 is moved relative to main carriage 5 toward the axis of the chuck and accordingly moves tool 15 radially outwardly from the center of the opening in the ampulla to engage the interior wall. At the same time chuck 12 is raised by cam 29 on track 28. Thus, the relative movement between the tool 15 and the ampulla is along a path extending radially outwardly at an angle normal to the axis of the ampulla. By this relative movement, tool 15 radially extends the interior wall to a substantially cylindrical shape as shown in Figure 3 and molding member 15' simultaneously forms the exterior wall into a cylinder.

What I claim as my invention is:

1. In an ampulla producing machine having a tube holding chuck, means for uninterruptedly moving the chuck along a path while continuously rotating said chuck about its longitudinal axis, the improvement which comprises a forming tool adjacent said path, means actuated on approach of the chuck along said path for aligning the tool with the chuck and the open end of a tube held by the chuck, means effective on movement of the chuck along the path for causing relative axial movement of the chuck and tool for positioning the tool within the tube opening, and means effective during continued movement of the chuck along the path for moving the tool radially outwardly relative to the chuck to engage and expand the interior wall of the tube.

2. In an ampulla producing machine having a tube holding chuck means for uninterruptedly moving the chuck past an end forming station while continuously rotating said chuck about its longitudinal axis, the improvement which comprises a forming tool at the station, a molding member associated with and spaced from said forming tool, means at the end forming station actuated on approach of the chuck to the station for aligning the forming tool with the chuck and the open end of a tube held by the chuck, means effective on movement of the chuck along the station for causing relative axial movement of the chuck and tool for positioning the tool within the tube opening, and means at the end forming station actuated during continued movement of the chuck past the station for moving the tool and the molding member radially relative to the chuck so that said tool engages and expands the interior wall of the tube while the molding member engages and shapes the exterior wall of the tube at a point on the ampulla end remote from the working area of said forming tool.

3. In an ampulla producing machine having a tube holding chuck, means for uninterruptedly moving said chuck along a path while continuously rotating about an axis, an end forming mechanism adjacent the path, said mechanism comprising an end forming tool movably supported adjacent the path of movement of the chuck, means adjacent said path operated on movement of the chuck along said path for positioning the tool within the end of a tube supported by the chuck, and cam means effective on continued movement of the chuck for moving the tool in a direction normal to the longitudinal axis of the chuck and tube carried thereby to expand the interior wall of the tube.

4. In an ampulla producing machine having a tube holding chuck means for uninterruptedly moving the chuck along a path while continuously rotating said chuck about its longitudinal axis, an end forming mechanism comprising an end forming tool supported adjacent the path of movement of the chuck, means supported near said path operated on movement of the chuck approaching the mechanism for positioning the tool within the end of a tube supported by the chuck, means effective on further movement of the chuck along said path for moving the tool in a direction normal to the longitudinal axis of the chuck to engage and expand the interior wall of the tube, and means actuated on movement of the chuck away from the mechanism for withdrawing the tool from the interior of the tube.

5. In an ampulla producing machine, an upper rotatable chuck for carrying a length of glass tubing from which are formed ampulla bodies, and a lower rotatable chuck for carrying an ampulla body formed from said glass tubing, means for moving said chucks along a path, an end forming device adjacent said path comprising a shiftable carriage, an end forming tool, means movably mounting said end forming tool on said carriage for movement normal to said path, means on one end of the carriage engageable with one of said chucks to cause said one end of the carriage to move with the chucks along a portion of said path and align said tool with an ampulla body end in the lower chuck, means along said path operative on movement of the chucks along said path for causing relative axial movement between the lower chuck and tool for positioning the tool within the opening of the ampulla body, and means also operative on movement of the chucks along said path for causing relative movement between said carriage and said means movably mounting the forming tool normal to the path of said chucks and radially of the ampulla carried thereby to engage and smooth the interior wall of the ampulla body.

6. In an ampulla producing machine, an upper rotatable chuck for carrying a length of glass tubing from which are formed ampulla bodies and a lower rotatable chuck for carrying an ampulla body formed from said glass tubing, means for moving said chucks along a path, an end forming device adjacent said path comprising a member swingably mounted adjacent said path, a carriage shiftably supported on said member, an end forming tool movably mounted on said carriage for movement normal to said path, means on one end of the carriage engageable with one of said chucks to cause said one end of the carriage to move with the chucks along a portion of said path, means along said path operative on movement of the chucks relative to the end forming device for causing relative axial movement between the lower chuck and the tool for positioning the tool within the opening of the ampulla body, and means also operative on movement of the chucks relative to the end forming device for causing relative movement between said carriage and said forming tool normal to the path of said chucks and radially of the ampulla carried thereby to engage and expand the interior wall of the ampulla body.

7. An ampulla producing machine as defined in claim 6, including an adjustable stop on said carriage, a projection on said member, and a tension spring extending between said carriage and said member for biasing said projection toward said adjustable stop to adjustably position said forming tool with respect to an ampulla on said lower chuck.

8. An ampulla producing machine as defined in claim 7, further including a stationary stop adjacent said end forming device limiting the rest position of said member such that said chuck engaging means is properly positioned for engagement with a chuck, and spring means biasing said arm toward said stationary stop.

9. In an ampulla producing machine, an upper rotatable chuck for carrying a length of glass tubing from which are formed ampulla bodies and a lower rotatable chuck for carrying an ampulla body formed from said glass tubing, means for moving said chucks along a path, an end forming device adjacent said path comprising a member swingably mounted adjacent said path, a main carriage shiftably supported on said member, an auxiliary carriage movably supported on said main carriage, an end forming tool mounted on said auxiliary carriage and movable therewith normal to the direction of movement of said chucks along said path, means on one end of the main carriage engageable with one of said chucks to cause said one end of said main carriage to move with the chucks along a portion of said path and align said tool with an ampulla body in the lower chuck, means along said path operative on movement of the chucks relative to the device for causing relative axial movement between the lower chuck and the tool for positioning the tool within the opening of the ampulla body, and cam means also operative on movement of the chucks past the device for causing a relative movement between said main carriage and said auxiliary carriage to cause said forming tool to move normal to the path of said chucks and radially of the ampulla carried thereby to engage and smooth the interior wall of the ampulla body.

10. In an ampulla producing machine having a tube holding chuck, means for uninterruptedly moving the chuck along a path while continuously rotating said chuck about its longitudinal axis, an end forming mechanism adjacent said path comprising a main carriage shiftable relative to the path, an auxiliary carriage on said main carriage and shiftable relative to said main carriage, an end forming tool carried by said auxiliary carriage, means on said main carriage actuated on movement of the chuck approaching the end forming mechanism shifting said main carriage to align the tool with a tube in the chuck, means situated along said path and operative on movement of the chuck relative to the end forming mechanism for causing relative axial movement of the chuck and tool for positioning the tool within the opening of the tube, and means associated with said mechanism and operative on movement of the chuck relative to the end forming mechanism for shifting said auxiliary carriage relative to said main carriage to move the tool in a direction normal to the longitudinal axis of said chuck so that said tool engages and expands the interior of the wall of the tube.

11. In an ampulla producing machine having a tube holding chuck, means for uninterruptedly moving said chuck along a path while continuously rotating said chuck about its longitudinal axis, an end forming mechanism supported adjacent said path comprising a main carriage shiftable relative to said path, an auxiliary carriage on said main carriage and shiftable relative to said main carriage, a tool on said auxiliary carriage, means on said main carriage operative on movement of said chuck along said path for maintaining said main carriage in fixed position relative to said chuck with said tool aligned with the opening in the end of a tube carried by the chuck, means situated along said path and operative on movement of the chuck along said path for causing relative axial movement between the chuck and tool for positioning the tool within the tube opening and means operative on further movement of said chuck along said path for shifting said auxiliary carriage on said main carriage to move said tool in a direction normal to a longitudinal axis of said chuck so as to engage and expand the interior wall of the tube.

12. In an ampulla producing machine having a tube holding chuck, means for uninterruptedly moving the chuck along a path while continuously rotating said chuck about its longitudinal axis, an end forming mechanism comprising a movably mounted carriage, means operative during movement of the chuck for retaining said carriage in fixed position relative to the chuck and extending radially from the axis of rotation of the chuck, a forming tool, means shiftably mounting said forming tool on said carriage, said tool being aligned with the chuck to enter a tube carried thereby when said carriage is in said fixed position relative to said chuck, means along said path for causing relative axial movement between the chuck and tool for positioning the tool within a tube carried by the chuck, and means actuated during movement of the chuck for shifting said tool on said carriage in a direction normal to the longitudinal axis of said chuck so as to engage and expand an interior wall of the tube carried by the chuck.

References Cited in the file of this patent
UNITED STATES PATENTS

| | | |
|---|---|---|
| 1,920,528 | Butler et al. | Aug. 1, 1933 |
| 2,266,417 | Eisler | Dec. 16, 1941 |
| 2,367,495 | Gray | Jan. 16, 1945 |
| 2,580,658 | Coby | Jan. 1, 1952 |
| 2,718,731 | Hughes et al. | Sept. 27, 1955 |

FOREIGN PATENTS

| | | |
|---|---|---|
| 889,969 | Germany | Sept. 14, 1953 |
| 490,516 | Italy | Feb. 13, 1954 |